US008666180B2

(12) United States Patent
Sen et al.

(10) Patent No.: US 8,666,180 B2
(45) Date of Patent: Mar. 4, 2014

(54) SYSTEM AND METHODS OF COMPRESSED SENSING AS APPLIED TO COMPUTER GRAPHICS AND COMPUTER IMAGING

(75) Inventors: Pradeep Sen, Albuquerque, NM (US); Aliakbar Darabi, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 19 days.

(21) Appl. No.: 13/512,951

(22) PCT Filed: Dec. 3, 2010

(86) PCT No.: PCT/US2010/058870
§ 371 (c)(1),
(2), (4) Date: May 31, 2012

(87) PCT Pub. No.: WO2011/069055
PCT Pub. Date: Jun. 9, 2011

(65) Prior Publication Data
US 2012/0294543 A1  Nov. 22, 2012

Related U.S. Application Data (60) Provisional application No. 61/283,512, filed on Dec. 4, 2009, provisional application No. 61/284,173, filed on Dec. 13, 2009, provisional application No. 61/336,363, filed on Jan. 21, 2010, provisional application No. 61/392,556, filed on Oct. 13, 2010.

(51) Int. Cl.
*G06K 9/36* (2006.01)
*G06T 1/00* (2006.01)

(52) U.S. Cl.
USPC ........................................... 382/233

(58) Field of Classification Search
USPC .................. 382/233, 232, 240, 254, 260, 276
See application file for complete search history.

(56) References Cited

U.S. PATENT DOCUMENTS

| | | | |
|---|---|---|---|
| 5,373,322 A | 12/1994 | Laroche et al. | |
| 5,717,789 A | 2/1998 | Anderson et al. | |
| 5,805,217 A | 9/1998 | Lu et al. | |
| 6,980,254 B1 | 12/2005 | Nishihashi et al. | |
| 7,030,917 B2 | 4/2006 | Taubman | |
| 7,088,392 B2 | 8/2006 | Kakarala et al. | |
| 7,106,914 B2 | 9/2006 | Tipping et al. | |
| 7,271,747 B2 | 9/2007 | Baraniuk et al. | |
| 7,289,049 B1 | 10/2007 | Fudge et al. | |
| 7,298,928 B2 | 11/2007 | Huang et al. | |
| 7,551,214 B2 | 6/2009 | Hasegawa | |
| 7,646,924 B2 | 1/2010 | Donoho | |
| 7,688,068 B2 | 3/2010 | Beatty | |
| 7,706,609 B2 | 4/2010 | Bennett et al. | |
| 8,014,616 B2 | 9/2011 | Chakraborty et al. | |

(Continued)

OTHER PUBLICATIONS

Sen et al., 'Compressive dual photography', Computer Graphics Forum (Proceedings of Eurographics 2009), Dec. 1, 2009, vol. 28, No. 2, pp. 609-618.

(Continued)

*Primary Examiner* — Yon Couso
(74) *Attorney, Agent, or Firm* — Valauskas Corder LLC (57) ABSTRACT

Compressed sensing can be mapped to a more general set of problems in computer graphics and computer imaging. Representation of a rendered scene in the formulation y=A$\hat{x}$ produces higher-quality rendering with less samples than previous approaches. A filter formulation $\Phi$ makes point samples compatible with wavelet and therefore allows reconstruction of 2-D images from a set of measured pixels (point samples).

19 Claims, 4 Drawing Sheets

(56) References Cited

U.S. PATENT DOCUMENTS

2006/0029279 A1  2/2006  Donoho
2009/0141995 A1  6/2009  Chakraborty et al.
2009/0161932 A1  6/2009  Chen
2009/0222226 A1  9/2009  Baraniuk et al.

OTHER PUBLICATIONS

Sen et al., 'A novel framework for imaging using compressed sensing', 16th IEEE International Conference on Image Processing Nov. 9, 2009, pp. 2133-2136.

Sen et al., 'Compressive Image super-resolution', Record of the 43rd Asilomar Conference on Signals, Systems and Computers, Nov. 3, 2009, pp. 1235-1242.

Peers et al., 'Compressive light transport sensing', ACM Transactions on Graphics, vol. 28, No. 1, Jan. 2009, pp. 1-18.

Bertalmio et al., 'Image inpainting', Proceedings of the 27th annual conference on computer graphics and interactive techniques, 2000, pp. 417-424.

Yang et al., 'Image super-resolution via sparse representation', IEEE Transactions on Image Processing, Nov. 2010, vol. 19, No. 11, pp. 2861-2873  LINK: http://research.microsoft.com/pubs/133164/sr-tip-final2.pdf.

SYSTEM AND METHODS OF COMPRESSED SENSING AS APPLIED TO COMPUTER GRAPHICS AND COMPUTER IMAGING

This application claims the benefit of: U.S. Provisional Patent Application No. 61/283,512 filed Dec. 4, 2009; U.S. Provisional Patent Application No. 61/284,173 filed Dec. 13, 2009; U.S. Provisional Patent Application No. 61/336,363 filed Jan. 21, 2010; and, U.S. Provisional Patent Application No. 61/392,556 filed Oct. 13, 2010.

STATEMENT CONCERNING FEDERALLY SPONSORED RESEARCH

This invention was made with U.S. government support, National Science Foundation grant number 0845396. The U.S. government may have certain rights in the invention.

FIELD OF THE INVENTION

The present invention relates generally to computer graphics and computer imaging, and in particular, the present invention relates to compressed sensing applications to accurately estimate signals from a set of samples such as a multidimensional signal estimated from point samples and to accurately estimate missing pixel values to obtain an approximation of an original signal.

The present invention may be used in a variety of applications such as movies, video games, medical imaging, dual photography, bio-sensing, animation, computer vision such as face recognition and light transport acquisition to name a few.

BACKGROUND OF THE INVENTION

A problem in computer graphics and computer imaging is rendering, which is the acquisition and processing of signals by a computer. A related problem in imaging is known as demosaicing, which is a digital process used to reconstruct a full color image from an incomplete signal output with missing color information such as from an image sensor. The problem of rendering is integral to computer graphics and computer imaging that it has been an active area of research for over 40 years.

Recently, there has been growing interest in using compressed sensing for various applications, but not to efficiently perform computer graphics and computer imaging. For purposes of this application, the term "image" as used herein may refer to a digital image or video stream with more than one signal—a multidimensional signal.

Multidimensional signals are often present in computer graphics and computer imaging. For example, an image includes spatial dimensions such that it is a 2-dimensional array of numbers defining a two-dimensional ("2-D") signal whereas a time-varying video is a three-dimensional ("3-D") signal because in addition to the spatial dimensions, there is a time dimension. In generating graphics or images for certain applications, the signal may have additional dimensions such as when performing Monte Carlo rendering. Monte Carlo rendering includes computational algorithms that rely on a series of random samples to compute results. For example, suppose there is a time varying scene that is being rendered with a camera with a finite aperture. In this case, the scene might describe a multidimensional function such as a five-dimensional ("5-D") function $f(x, y, u, v, t)$ where $(x, y)$ describes the position of the sample on the image plane, t is the time at which the sample is taken, and $(u, v)$ is the position on the aperture for depth-of-field effects. Typically Monte Carlo rendering randomly samples the multidimensional function by picking random values for x, y, u, v, t and then evaluating the function. A 2-D image can be produced by integrating out certain dimensions. Typically, if only a small number of samples are taken, the resulting image is extremely noisy and unacceptable, because there are not enough samples to properly represent the signal. As more samples are taken, the resulting image converges to the theoretically-correct image slowly over time.

In the field of imaging, compressed sensing has been used to try to accelerate the acquisition of images. However, most of compressed sensing techniques in this field capture an image by taking projections of the image with a large set of different random patterns. Unfortunately, these methods require thousands of serial measurements in order to reconstruct a high-quality resolution image, which makes them impractical for most real-world imaging applications, because they are simply too slow.

In the field of rendering, it is well known that the final, rendered image can be efficiently compressed with a transform-coding compression algorithm, which implies that the information content of the image can be described more compactly than with its pixel representation.

Most systems, however, expend their effort in rendering every single pixel in the spatial domain of the image first, only to discard the redundant information during the post-process compression. Most rendered images are eventually compressed by some method of either static—JPEG or JPEG2000—or video—MPEG or MPEG4—image compression. Similar to capturing an image, it would be advantageous to exploit the sparsity in the transform domain directly during rendering so that only the important parts of the image are rendered, as opposed to rendering everything first and then throwing away most of the useless information.

This seems to imply that there might be a way to accelerate the rendering process directly in the transform domain. Unfortunately, the obvious approach of taking the transform of a signal is extremely difficult for anything other than extremely simple analytic scene representations. In addition, all of the known rendering algorithms to date such as ray tracing, REYES, and scanline algorithms fail to map to other transform domains.

In order to develop a framework that exploits sparsity in a transform domain, it has to be compatible with the traditional point-sampling methods common to all of these rendering algorithms. In the area of image rendering, transform compression techniques have been used primarily for accelerating the computation illumination. For example, an elegant hierarchical approach has been used to create a multi-resolution model of the radiosity in a scene. However, this approach does not explicitly use a wavelet basis, nor does it exploit the final image coherence.

Recently, interest in transform-domain techniques for illumination has been renewed with research into efficient pre-computed radiance transfer methods using bases such as spherical harmonics. Again, these approaches focus on using the sparsity of the illumination or the Bidirectional Reflectance Distribution Function ("BRDF") in a transform domain, not on exploiting the sparsity of the final image.

In terms of using transform-domain approaches to synthesize the final image, the most successful work has been in the field of volume rendering. In this area, both the Fourier and wavelet domains have been leveraged to reduce rendering times. However, this approach does not map well to the problem of exploiting sparsity in the final image to accelerate standard image rendering.

Most of the work in accelerating ray tracing has focused on novel data structures for accelerating the scene traversal. However, there are algorithms to accelerate rendering that take advantage of the spatial correlation of the final image, which in the end is related to the sparsity in the wavelet domain. Most common is the process of adaptive sampling in which a fraction of the samples are computed and new samples are computed only where the difference between measured samples is large enough such as by a measure of contrast. These adaptive sampling methods still compute the image in the spatial domain making it impossible to apply arbitrary wavelet transforms.

Although there are sampling/reconstruction techniques for improving rendering to generate better quality images in shorter times than with standard techniques, these techniques focus on sampling the multidimensional scene information efficiently instead of focusing on reconstructing the image efficiently in a transform domain.

Furthermore, many times in rendering one must compute the definite integral of an unknown function. Other algorithms must solve the integral of a signal that is known but difficult to describe in analytic form suitable for integration. This problem is encountered in a variety of application areas such as algorithms that compute the illumination in a scene, algorithms that determine the reflection off a surface with a complex BRDF, or even algorithms that synthesize images by calculating image effects such as depth-of-field or motion blur for image synthesis.

The most common approach for solving these integrals in computer graphics is known as "Monte Carlo" integration, where a large number of random point samples of the function are taken and used to estimate the value of the integral with some probability. As more samples are taken, the variance of the result is reduced and the integral is estimated more accurately. Theoretically, an infinite number of samples are needed to get an exact estimate of the value of the integral. In practice, it is well known that these methods require many samples to converge, and as a result consume most of the computation time in the algorithms.

Another problem in computer graphics occurs when generating a discrete image of a continuous scene representation, known as antialiasing. One approach specifies that a signal must be sampled at more than twice its highest frequency, otherwise known as the Nyquist rate, in order to be reconstructed accurately. The continuous scene can have sharp boundaries, which means that theoretically the signal has infinite bandwidth and would therefore require an infinite number of samples for reconstruction. Therefore, if the signal is sampled at a rate lower than the Nyquist rate, aliasing will occur where high frequency content not captured by the sampling rate appears as lower frequency content. In rendering, aliasing in the image appears as the "jaggies" along sharp boundaries in the scene.

Antialiasing algorithms attempt to band limit the signal so that the frequency of the signal will be within the Nyquist rate before being sampled. Theoretically, this can be done by the convolution with a sinc( ) function in the spatial domain (multiplication by a rect( ) function in the frequency domain), but in practice other approaches are typically used since the sinc( ) is not a localized filter. One common approach is to use a box filter in pixel space, which effectively integrates the signal under a pixel in order to antialias it. These integrals are typically computed from a few fixed samples in the case of real-time rasterization hardware, or from many random samples in the case of high-end rendering systems.

There is a need for a system and methods that provides an improved approximation of an original signal that provides better results, including the generation of graphics or images with little or no distortion artifacts or motion blur. The present invention satisfies this demand.

SUMMARY OF THE INVENTION

The present invention relates to reconstructing signals of computer graphics and computer imaging applications using compressed sensing. Compressed sensing—also known as compressive sensing, compressive sampling and sparse sampling—is a technique for acquiring and reconstructing a signal utilizing the prior knowledge that it is sparse or compressible. A signal is sparse in a transform domain if it has a large majority of zeros (0) in its transform representation.

According to the present invention, a signal may be reconstructed very accurately from a small set of linear measurements given that the original signal is sparse in a transform domain. In computer graphics and computer imaging, compressed sensing is used to accurately estimate signals from a set of samples—such as a multidimensional signal estimated from point samples—and to accurately estimate missing pixel values.

This invention uses compressed sensing (or sparse signal reconstruction) at its core to accelerate the process of taking samples to properly represent the signal by converging the resulting image to the theoretically-correct image over time.

The present invention takes point samples, or a set of measured pixels, of a multidimensional function and reconstructs the entire signal from a set of samples assuming that the original signal is sparse in a transform domain. The present invention is applicable to 2-D signals corresponding to images with applications in rendering and imaging. The present invention is also applicable to 3-D signals corresponding to video streams with applications in reconstruction and motion blur. The present invention is also applicable to signals in 4-D or more corresponding to applications in global illumination rendering effects.

When dealing with 2-D signals in particular, wavelets are typically used to achieve the appropriate amount of sparsity. However, many applications in both rendering and imaging require the use of point samples. Wavelets are fundamentally incompatible with point samples in terms of compressed sensing because the wavelet basis is not incoherent with point samples. Compressed sensing requires that the compression basis (in this case wavelet) be incoherent with the measurement basis (in this case point samples) because the few non-zero elements in the compression basis are trying to be identified with a small number of measurements in the measurement basis. If the two were very coherent, then taking a few measurements with one would give us very little information about the other. In the case of wavelets/point-samples, it is very simple to describe a point-sample delta function with a few wavelets. Therefore, the two are very coherent, and cannot be used directly in the compressed sensing formulation.

Therefore, the blurred wavelet formulation of this invention—a Gaussian filter in the sampling step—makes wavelets compatible with point samples. In embodiment of the invention related to super-resolution, the Gaussian filter models the downsampling process that generates the low resolution image. Although a Gaussian filter is used, other filters are contemplated to increase the incoherency between wavelets and point samples.

The present invention is applicable to problems in rendering such as global illumination, antialiasing, and motion blur.

It is also contemplated that the present invention may be used in any applications that use Monte Carlo to sample a multi-dimensional function.

The present invention can be applied to problems in imaging since point samples are used, and the integral projections of the other approaches is not needed. This accelerates the imaging process since a lot of serial measurements are not needed.

The present invention can be applied to structured illumination which can be used for problems in graphics such as light transport acquisition and environment matting as well as computer vision such as 3-D reconstruction and 3-D stereo if Bernoulli patterns are used.

The present invention may also be applied to applications for image interpolation such as hole filling and in-painting. The present invention may be used for high-speed video applications. Typically, in a high-speed video the biggest disadvantage is bandwidth—it takes a finite time to read all the data from the sensor. According to the present invention, only a fraction of the pixels at any frame needs to be read, and then a high-quality spatio-temporal volume of the samples that weren't measured can be reconstructed. Reducing the bandwidth may permit the increase the frame rate.

As an example, to estimate a signal x that is sparse in the transform domain $\Psi$, the process can be written as $y=Sx$ if linear measurements of the signal are taken, where y is the set of measurements, and S is the sampling matrix.

If the transform domain representation $x=\Psi\hat{x}$ is substituted into the process of linear measurements, the measurement process becomes $y=S\Psi\hat{x}=A\hat{x}$ where A is the measurement equation. Compressed sensing theory allows the estimation of $\hat{x}$ (and hence x) very accurately from a small set of random linear measurements in y if the transform-domain signal $\hat{x}$ is sparse, meaning that it has a lot of zeros thereby enabling the measurement of signals from a few samples.

According to one embodiment of the present invention, x is an image with missing pixel information. Therefore, estimation of image x can be accomplished by measuring a random subset of pixels using a ray tracing rendering system. Then, the missing pixels are estimated by searching for the sparsest $\hat{x}$ that matches the measurements we have made.

According to another embodiment of the present invention, compressed sensing is used to fill in the pixels of an image that has been measured using a Bayer mosaic. It is contemplated that this embodiment may be used in conjunction with digital cameras. Most cameras do not measure Red-Green-Blue ("RGB") at every pixel, but rather have a specific filter on each pixel so that either red, green, or blue are measured interchangeably at every pixel in a specific pattern called a Bayer mosaic. Specifically, a Bayer mosaic has a RGB arrangement on a square grid of photosensors. Although the RGB pattern is fixed, it should be noted that randomness is not essential for compressed sensing according to the present invention. The present invention allows the missing RGB values to be computed from neighboring values.

In yet another embodiment of the invention, a high resolution reconstructed image is created from a downsampled image. A downsampled image is an image of which the sampling rate of a signal is reduced to decrease the data rate or the size of the data. The high resolution reconstructed image is enhanced to show details for the downsampled image. According to this embodiment of the present invention, the missing pixel information is provided from the pixels measured at the lower resolution.

The present invention allows compressed sensing algorithms to work when using point samples and a wavelet compression basis. Wavelets are much better at compressing images and only require approximately 3% wavelet coefficients to accurately represent an image—thus, it is approximately 97% sparse. Although wavelets make the transform-domain signal $\hat{x}$ more sparse, they are unfortunately incompatible with the point samples unless a filter $\Phi$ in the formulation is introduced. Specifically, a blurred image $x_b$ is assumed to exist, which can be sharpened to form the original image $x=\Phi^{-1}x_b$ where $\Phi^{-1}$ is a sharpening filter. The sampling process can now be written as $y=Sx=S\Phi^{-1}x_b$. Since the blurred image $x_b$ is also sparse in the wavelet domain, the wavelet compression basis can be incorporated to get $y=S\Phi^{-1}\Psi\hat{x}_b$ and the standard compressed sensing framework can now be used to solve for the sparset $x_b$. Once $x_b$ has been found, the final image can be computed by taking the inverse wavelet transform and sharpening the result $x=\Phi^{-1}\Psi\hat{x}_b$.

With respect to one aspect of the invention, introducing a filter makes wavelets compatible with point samples in a compressed sensing formulation. In one embodiment, a Gaussian filter is used for $\Phi$. Since the filtering process can be represented as multiplication in the frequency domain, the Gaussian filter is $\Phi=F^HGF$ where F is the Fourier transform matrix and G is the diagonal matrix with values of a Gaussian function along its diagonal.

With respect to another aspect of the invention, the present invention facilitates reconstruction of multidimensional signals beyond 2 dimensions, such as a video stream (3 dimensions), or a rendering scene with a plurality of parameters including, for example, aperture, area light sources, diffuse reflections, depth-of-field, sub-surface scattering and motion blur. Extending signals to the various dimensions, often the sparsity in the Fourier domain is sufficient to reconstruct them accurately with a few samples. Therefore, the filter formulation discussed above is not required in this embodiment. However, the present invention uses compressed sensing to reconstruct multidimensional signals in Monte Carlo rendering.

The multidimensional function $f(x, y, u, v, t, \ldots)$ can be point sampled and then reconstructed assuming that it is sparse in a transform domain. If the dimensionality is high (4 or higher) Fourier transforms work well and the resulting reconstructed signal is much better than with conventional approaches. However, in lower dimensional cases (less than 4), the blur filter formulation discussed above is needed since wavelets are used.

According to the present invention, the final image is desired in rendering applications—not the multidimensional signal. Therefore, the reconstructed signal can be integrated down over the parameters that are not needed to produce the final image:

$I(x, y)=\iiint f(x,y,u,v,t)dudvdt$. Thus, integrating over time produces motion-blur, integrating over the (u, v) coordinate on the aperture produces depth-of-field, and integrating over the pixel footprint produces antialiasing. The present invention facilitates computation of integrals of unknown functions very efficiently.

As discussed above, point sample measurements are used, which is particularly feasible in simulated environments (such as rendering systems) or certain imaging systems. Yet, with respect to another aspect of the invention, other kinds of linear measurements can be performed such as projecting light patterns and then integrating the reflected light in a sensor. This allows integral projections to be performed quite easily. Therefore, the present invention provides a process of illuminating Bernoulli random light patterns. The idea of projecting Bernoulli random light patterns with a projector in order to reconstruct the signal using compressed sensing is quite useful.

According to another embodiment, the present invention is directed to a framework that exploits the known sparsity of a final rendered image in a transform domain such as wavelet, by leveraging results in the field of compressed sensing. Wavelet transforms are common for image compression. However, wavelet transforms are not the only way to transform the image; for example, Fourier, ridgelet, curvelets, and others might also be used.

The present invention, incorporating a computer system running an algorithm, takes a small set of point samples of a captured image or scene in the spatial domain using a ray tracer and estimates the wavelet transform of the image during rendering. A ray tracer is a particular rendering system and is easy to use because of its flexibility in selecting non-uniform samples, although other rendering systems exist and are also contemplated, such as a rasterizer, REYES architecture, among others.

Since the energy of the image is concentrated more compactly in the wavelet domain, less samples are required for a result of given quality than with conventional spatial-domain rendering.

By taking the inverse wavelet transform of the result, an accurate approximation of the desired final image can be computed. Compressive rendering can generate visually lossless images with approximately 75% of the pixel samples using a non-adaptive scheme. Since the algorithm of the present invention works in image space, it is also completely independent of scene complexity and scales well for complex scenes.

An image is compressible in a transform domain, then optimization algorithms can be used to approximate the image accurately using a smaller number of spatial samples.

The present invention produces high-quality resolution images faster than with conventional methods. High-quality resolution images are generated with fewer samples. The present invention is the first to apply the theory of compressed sensing to the problem of rendering. Particularly, the present invention works with wavelet functions within the compressed sensing framework. Compressed sensing requires incoherence between the sampling basis and the compression basis. Rendering systems require point samples and image compression is best done with wavelets, which unfortunately are not incoherent bases. The present invention overcomes this challenge and renders images efficiently using wavelets.

The present invention synthesizes high-quality resolution images at lower sampling rates using both adaptive and non-adaptive sampling schemes. Compressive rendering achieves visual lossless-ness without having to sample every pixel in the image.

The present invention integrates unknown functions, or signals, under the framework of compressed sensing. Specifically, a theory of compressed sensing demonstrates that a signal from a small set of linear measurements can be reconstructed if the signal is sparse in a transform domain that is incoherent with the measurement basis.

Applied to the problem of integration for antialiasing to reduce or minimize the distortion of artifacts, it is possible to compute the integral of a sparse function exactly with a fixed set of point samples. In instances where the signal is not sparse but compressible, the present invention can still be used to approximate the integral of the function within bounds. According to the present invention, the term "compressive integration" refers to exploitation of sparsity to compute the integrals of the function they represent, or simply compressed sensing applied to integration of unknown functions.

Under the framework of compressed sensing, the integral can be exactly evaluated when the signal is sparse in a transform domain using a few point samples without requiring the lengthy iterations of existing approaches such as the Monte Carlo approach thereby accelerating integration. As a result, well antialiased images are generated with fewer samples compared to traditional approaches.

In one embodiment, the present invention is a method for reconstructing a signal using compressed sensing. An original signal is provided and a plurality of random point samples of a multidimensional function is selected. The original signal is assumed to be sparse in a transform domain. It is also contemplated that the original signal may be assumed to be sparse in the spatial domain such that no transform is necessary. The original signal is measured at one or more locations of the random point samples to obtain measurements. A signal is solved for in the transform domain wherein the signal is as sparse as possible and matches the measurements. When solving for the signal, wavelets for compression may be used. Furthermore, a filter may be applied such as a Gaussian filter. Then, measurements of missing point samples from the signal in the transfer domain are estimated. Finally, an image is computed. It is also contemplated that a Bernoulli pattern can be added for illumination.

According to the present invention, the original signal may be two-dimensional, three-dimensional or multidimensional such as four-dimensional. In one embodiment, a three-dimensional signal may relate to a scene moving over time, which produces an image with motion blur. In another embodiment, a two-dimensional signal may relate to rendering an image and may further relate to image antialiasing. In another embodiment, the multidimensional signal may relate to rendering multidimensional effects, such as depth-of-field, area light sources, diffuse reflection, sub-surface scattering. Where the multidimensional signal is four-dimensional, the signal may relate to light transport between a two-dimensional light source, such as a projector or monitor, and a two-dimensional imaging sensor.

It is an object of the present invention to accelerate the rendering process directly in the transform domain. It is contemplated that the present invention focused on reconstructing an image efficiently in a transform domain may be used with existing techniques that focus on sampling the multidimensional scene information in order to accelerate or improve rendering to generate better quality images in shorter times.

It is another object of the present invention to integrate unknown functions based on the theory of compressed sensing. By assuming that the signal is sparse in a transform domain, the framework can solve for the most significant transform coefficients and therefore directly compute the integral.

Another object of the present invention is to implement a new antialiasing algorithm for ray tracing that provides results superior to random or stratified jittered sampling—both commonly used approaches in antialiasing high-end rendering.

Another object of the present invention is to synthesize an image from a captured image or scene information. The image is synthesized by taking a small set of point samples in the spatial domain and estimating the wavelet transform of the image during rendering. A ray tracer may be used to take the point samples in the spatial domain.

Since the energy of the image is concentrated more compactly in the wavelet domain, it is an object of the present invention to use less samples to synthesize an image for a result of given quality than the number of samples used with conventional spatial-domain rendering.

It is an object of the present invention to use an adaptive compressive rendering algorithm or a non-adaptive compressive rendering algorithm to synthesize an image from scene information.

It is an object of the present invention to generate a high-quality resolution image from a single low-resolution input image that is superior to that which is produced through known super-resolution algorithms. The high-quality resolution image is generated from a single low-resolution input image without any training data set. The high-quality resolution image is generated by taking advantage of the compressibility of the image in the wavelet domain to generate a high-resolution result. A Gaussian low-pass filter is used as a sampling matrix. The Gaussian low-pass filter simulates the antialiasing or bandlimiting process prior to down sampling, and, as a result, during the inverse procedure, the image gets sharper by the inverse of the Gaussian.

Another object of the present invention is to accurately fill in missing pixel information of a sensor array device that has defective pixels. Reconstruction of an image according to the present invention reduces the bandwidth of an imaging device since only a fraction of pixels of an image is needed to generate a high-quality resolution image versus the entire array.

The described embodiments are to be considered in all respects only as illustrative and not restrictive, and the scope of the invention is not limited to the foregoing description. Those of skill in the art will recognize changes, substitutions and other modifications that will nonetheless come within the scope of the invention and range of the claims.

BRIEF DESCRIPTION OF THE DRAWING

The preferred embodiments of the invention will be described in conjunction with the following drawings provided herein to illustrate and not to the limit the invention.

DETAILED DESCRIPTION OF THE PREFERRED EMBODIMENT

The present invention is directed to a system and methods to accurately estimate missing pixel values using compressed sensing or sparse signal reconstruction. According to the present invention, a signal can be reconstructed very accurately from a small set of linear measurements given that the original image is sparse in a transform domain.

The present invention takes point samples, or a set of measured pixels, of a multidimensional function and reconstructs the signal from the set of samples assuming that the original signal is sparse in a transform domain (otherwise referred to herein as compressed sensing). The present invention is applicable to 2-D signals corresponding to images with applications in rendering and imaging. The present invention is also applicable to 3-D signals corresponding to video streams with applications in reconstruction and motion blur. The present invention is also applicable to signals in 4-D or more corresponding to applications in global illumination rendering effects.

When dealing with 2-D signals in particular, wavelets are typically used to achieve the appropriate amount of sparsity. However, many applications require the use of point samples. Wavelets are fundamentally incompatible with point samples in terms of compressed sensing. Therefore, the blurred wavelet formulation—a Gaussian filter in the sampling step—makes wavelets compatible with point samples. In embodiment of the invention related to super-resolution, the Gaussian filter models the downsampling process that generates the low resolution image. Although a Gaussian filter is used, other filters are contemplated to increase the incoherency between wavelets and point samples.

As an example, to estimate a signal x that is sparse in the transform domain $\Psi$, the process can be written as y=Sx if linear measurements of the signal are taken, where y is the set of measurements, and S is the sampling matrix.

If the transform domain representation x=$\Psi\hat{x}$ is substituted into the process of linear measurements, the measurement process becomes y=S$\Psi\hat{x}$=A$\hat{x}$ where A is the measurement equation. Compressed sensing theory allows the estimation of $\hat{x}$ (and hence x) very accurately from a small set of random linear measurements in y if the transform-domain signal $\hat{x}$ is sparse, meaning that it has a lot of zeros thereby enabling the measurement of signals from a few samples.

According to one embodiment of the present invention, x is an image with missing pixel information. Therefore, estimation of image x can be accomplished by measuring a random subset of pixels using a ray tracing rendering system. Then, the missing pixels are estimated by solving for the sparsest $\hat{x}$ that matches the measurements made.

According to another embodiment of the present invention, compressed sensing is used to fill in the pixels of an image that has been measured using a Bayer mosaic. It is contemplated that this embodiment may be used in conjunction with digital cameras. Most cameras do not measure Red-Green-Blue ("RGB") at every pixel, but rather have a specific filter on each pixel so that either red, green, or blue are measured interchangeably at every pixel in a specific pattern called a Bayer mosaic. Specifically, a Bayer mosaic has a RGB arrangement on a square grid of photosensors. Although the RGB pattern is fixed, it should be noted that randomness is not essential for compressed sensing according to the present invention. The present invention allows the missing RGB values to be computed from neighboring values.

The present invention performs significantly better than bilinear interpolation and other pixel-interpolation approaches that might be used such as in-painting, hole filling, and edge-aware interpolation, to name a few. Specifically, a wavelet basis for compression is used, which offers increased sparsity. It is contemplated that other bases other than wavelet may be used, such as ridgelets, curvelets, any other general compression basis or even a patch-based dictionary. Wavelets are not incoherent with the spatial point samples. After all, the better a transform is at defining localized features, the more coherent it will be with the spikes of a point sample basis and the less likely it will work with the compressed sensing framework. The present invention can be applied to problems in imaging since point samples are used, and the integral projections of the other approaches is not needed.

Figure 1:
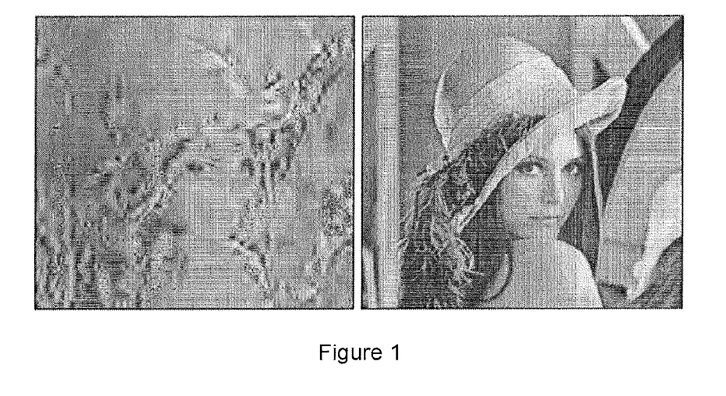
FIG. 1 illustrates compressive sensing reconstruction with wavelets from 25% pixel samples and filtered wavelet formulation according to one embodiment of the present invention.

The result of trying to use a wavelet basis by itself is shown on the left of FIG. 1. As shown on the left of FIG. 1, compressed sensing reconstruction with wavelets from 25% pixel samples has problems. The image on the right of FIG. 1 illustrates the result of using the filtered wavelet formulation presented from the same samples thereby illustrating significant improvement over traditional interpolation techniques. After the addition of the filter, the coherence between a sampling basis and compression bases can be found. The filtered wavelet decreases coherence with the point-sampling basis. In one embodiment the filter is a Gaussian filter, although any kind of filter is contemplated. Therefore, the reduction in coherence allows use of compressed sensing.

According to the present invention, a simple algorithm can be performed in three steps. The first step involves the selection of random pixels. A Poisson-disk distribution—where all the pixel samples are separated by at least a fixed distance—works better than completely random samples. Once the pixels are selected, the imaging process is simulated in the rendering system at these pixel locations. The missing pixels are solved for using a greedy algorithm. In one embodiment, the missing pixels are solved for using Regularized Orthogonal Matching Pursuit ("ROMP"), using Daubechies-8 ("DB-8") wavelets for compression. It is contemplated that any greedy algorithm may be used that approximate solutions to the $l_0$ problem such as SpaRSA. Furthermore, it is contemplated that a $l_1$ solver may be used, such as linear programming or other forms of convex optimization. The present invention contemplates the use of other solvers such as those developed after the filing date of the present invention. Once $x_b$ is found, the desired image may be computed. As an example of one embodiment, the entire reconstruction algorithm is written in C and takes 100 seconds on a laptop with 2.2 GHz processor to process a 512×512 image. A Graphics Processing Unit ("GPU") implementation is also possible.

Unfortunately, traditional compressed sensing algorithms do not work when using point samples and a wavelet compression basis. Wavelets are much better at compressing images and only require approximately 3% wavelet coefficients to accurately represent an image—thus, it is approximately 97% sparse. Although wavelets make the transform-domain signal $\hat{x}$ more sparse, they are unfortunately incompatible with the point samples unless a filter $\Phi$ in the formulation is introduced. Specifically, a blurred image $x_b$ is assumed to exist, which can be sharpened to form the original image $x=\Phi^{-1}x_b$ where $\Phi^{-1}$ is a sharpening filter. With respect to one aspect of the invention, introducing a filter makes wavelets compatible with point samples in a compressed sensing formulation. In one embodiment, a Gaussian filter is used. Since the filtering process can be represented as multiplication in the frequency domain, the Gaussian filter is $=\Phi=F^H GF$ where F is the Fourier transform matrix and is the diagonal matrix with values of a Gaussian function along its diagonal.

Figure 2:
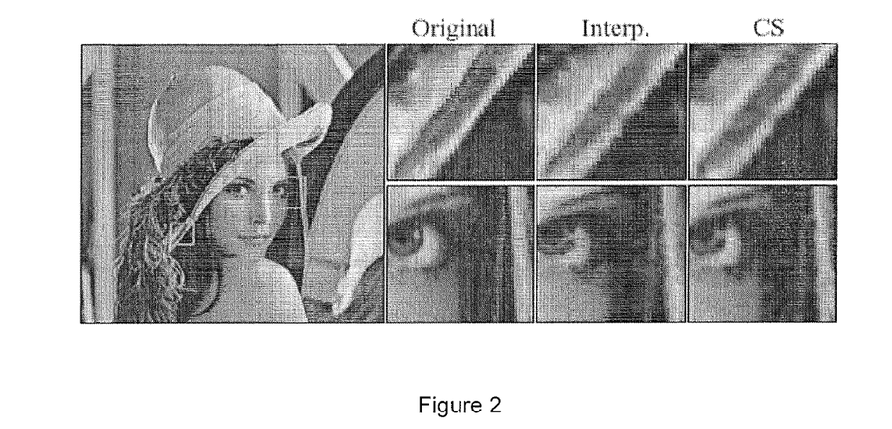
FIG. 2 illustrates images reconstructed from 25% pixels using interpolation and compressed sensing according to the present invention.

The sampling process can now be written as $y=Sx=S\Phi^{-1}x_b$. Since the blurred image x, is also sparse in the wavelet domain, the wavelet compression basis can be incorporated to get $y=S\Phi^{-1}\Psi\hat{x}_b$ and the standard compressed sensing framework can now be used to solve for the sparset $x_b$. Once $x_b$ has been found, the final image can be computed by taking the inverse wavelet transform and sharpening the result $x=\Phi^{-1}\Psi\hat{x}_b$ For comparison, the entire image from the non-uniform pixel locations needs to be interpolated. One traditional way to do this is to tessellate the samples into a triangular mesh using Delaunay triangulation and then bilinearly interpolate across each triangle to fill in the missing pixels. The results for the images are shown in FIG. 2. Specifically, FIG. 2 illustrates images reconstructed from 25% pixels using interpolation and the compressive imaging framework according to the present invention. For each inset the original, the interpolated result, and the result of the compressive sensing method according to the present invention is shown.

In yet another embodiment of the invention, a high resolution reconstructed image is created from a downsampled image. A downsampled image is an image of which the sampling rate of a signal is reduced to decrease the data rate or the size of the data. The high resolution reconstructed image is enhanced to show details for the downsampled image. According to this embodiment of the present invention, the missing pixel information is provided from the pixels measured at the lower resolution.

The present invention is applicable to problems in rendering such as global illumination, antialiasing, and motion blur. It is also contemplated that the present invention may be used in any applications that use Monte Carlo to sample a multi-dimensional function. Again, if the signal is sparse in a transform domain, an integral can be accurately evaluated using a small set of point samples without requiring the lengthy iterations of Monte Carlo approaches.

With respect to another aspect of the invention, the present invention facilitates reconstruction of multidimensional signals beyond 2 dimensions, such as a video stream (3 dimensions), or a rendering scene with a plurality of parameters including, for example, aperture, area light sources, and motion blur. Extending signals to the various dimensions, often the sparsity in the Fourier domain is sufficient to reconstruct them accurately with a few samples. Therefore, the filter formulation discussed above is not required in this embodiment. However, the present invention uses compressed sensing to reconstruct multidimensional signals in Monte Carlo rendering.

The multidimensional function $f(x, y, u, v, t, \ldots)$ can be point sampled and then reconstructed assuming that it is sparse in a transform domain. If the dimensionality is high (4 or higher) Fourier transforms work well and the resulting reconstructed signal is much better than with conventional approaches. However, in lower dimensional cases (less than 4), the blur filter formulation discussed above is needed since wavelets are used.

According to the present invention, the final image is desired in rendering applications—not the multidimensional signal. Therefore, the reconstructed signal can be integrated down over the parameters that are not needed to produce the final image:
$I(x, y) = \iiint f(x,y,u,v,t)dudvdt$. Thus, integrating over time produces motion-blur, integrating over the (u, v) coordinate on the aperture produces depth-of-field, and integrating over the pixel footprint produces antialiasing.

In one embodiment, compressed sensing is used to evaluate the integral of the continuous scene representation over the footprint of a pixel in order to perform box-filtered antialiasing. A few random point samples of scene per pixel are taken. These samples are positioned on an underlying grid that matches the size of the unknown discrete function and is aligned with its samples. A compressed sensing solver is used to approximate a solution which can then be used to calculate the unknown discrete function. Once the unknown discrete function is calculated, it can be integrated over the pixel to perform antialiasing. If the unknown discrete function is sparse in the transform domain, only a small set of samples are needed to evaluate the integral accurately.

To avoid aliasing, the size of the discrete vector must be large enough to support twice the highest frequency of the unknown function. Normally, aliasing in image synthesis is traditionally caused by insufficient sampling with respect to the highest frequency contained in the signal. According to the present invention, however, the number of samples does not make a difference as long as it is enough to support the sparsity of the signal, not the highest frequency. Rather, the size of the problem solved using compressed sensing must be large enough to accommodate all the frequencies.

It should be noted that the Fourier basis commonly used with compressed sensing is not suitable for antialiasing since images are actually not very sparse in the Fourier domain. Since the quality of the algorithm according to the present invention depends on the sparsity of non-zero basis function, a basis that is extremely efficient at representing natural images is desired. Therefore, the Daubechies-8 ("DB-8") wavelet is used. Therefore, the signal is bandlimited or antialiased based on the final image resolution. Therefore, a filter is included that is sized according to the final resolution, which serves to both bandlimit the signal based on the downsampling rate as well as reduce the coherency between the point samples and wavelet basis. To summarize the antialiasing algorithm, random samples of the scene with a ray tracer are taken to form a measurement vector. A compressed sensing solver such as ROMP is used to solve for the wavelet transform of the estimate of the high-resolution image which has been adequately filtered for downsampling. The inverse wavelet transform is taken to compute the filtered image in the spatial domain. Then it is downsampled with a box filter to compute the final image.

The addition of a blurring filter means that the measurement matrix is composed of two parts: the point samples and the blurred wavelet matrix which acts as the compression basis. This is related to reduction of the overall coherence between the point samples and the compression basis. However, there are two subtle, but important, differences between the approaches. First, the Gaussians are sized based on the size of the final image, not the sampling rate. This improves antialiasing since it enables proper filtering of the signal before downsampling. The second difference is that while an inverse filter can be used to get a sharp, high resolution result for direct viewing, the filtered result is used for downsampling because it has been appropriately bandlimited.

Figure 3:
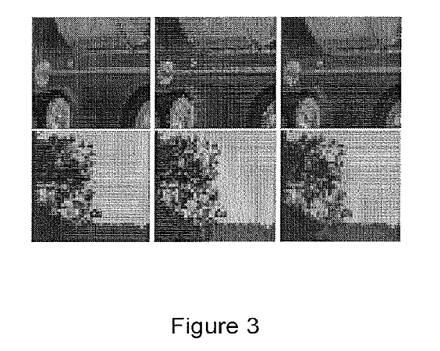
FIG. 3 shows a comparison of stratified sampling and antialiasing according to the present invention.

The results are compared against a traditional antialiasing technique using random samples with Monte Carlo integration and another that uses jittered, stratified sampling to reduce variance. FIG. 3 shows a comparison of stratified sampling and antialiasing according to the present invention. The reference image is shown in the first column. The reference image is rendered at 16 stratified samples per pixel. The stratified image is shown in the second column and the antialiased image according to the present invention is shown in the last column. The stratified image of the second column and the antialiased image of the last column are rendered at 4 stratified samples per pixel. As can be seen in FIG. 3, the images from the stratified Monte Carlo integration show more jaggedness.

Now the present invention is discussed in reference to the rendering of motion blur. Motion blur occurs in dynamic scenes when the projected image changes as it is integrated over the time the camera aperture is open. Traditionally, Monte Carlo rendering systems emulate motion blur by randomly sampling rays over time and accumulating them together to estimate the integral. The approach of the present invention to motion blur is very similar to that of the antialiasing algorithm. First, a set of samples of the scene are taken, except that now the measurements are also spaced out in time to sample the discrete spatio-temporal volume, which represents a set of video frames over the time the aperture was open.

Compressed sensing is used to reconstruct the representation of the volume in transform domain. After applying the inverse transform to recover an approximation to the original set of video frames, it is integrated over time to achieve the desired result. However, there are two important differences from the antialiasing algorithm. First, recall that the reconstruction of the static image for antialiasing required the addition of a filter to the wavelet basis to make it compatible with point sampling. Due to the existence of a volume of pixel data, the correlation between pixels has been increased by an extra dimension.

The sparsity of the signal in the Fourier domain is now sufficient to allow for adequate reconstruction by compressed sensing algorithms from a small set of point samples. This means that the Fourier basis for the transform domain can be used, which is compatible with point sampling. Second, because a simple Fourier basis is present, the SpaRSA compressed sensing solver worked more robustly and faster for reconstructing the video data sets.

Figure 4:
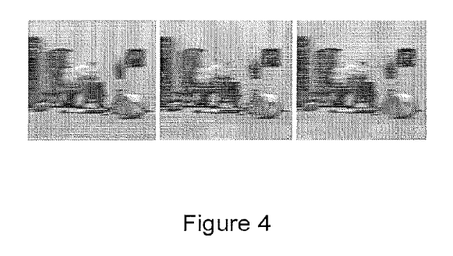
FIG. 4 illustrates a visual comparison of motion blur results according to the present invention.

First, motion blur is tested by moving the camera as shown in FIG. 4. FIG. 4 illustrates a visual comparison of motion blur results. The reference image shown in the first column was rendered with 70 temporal samples per pixel, while the other two—random sampling in the second column and the algorithm according to the present invention—were rendered with a single random sample per pixel in time. As shown in FIG. 4, one sample per pixel provides a reasonable motion blur, especially when compared to the simple Monte Carlo approach.

The quality of the reconstructed frames of the spatio-temporal volume is actually quite high suggesting that compressed sensing could also be used to render animated scenes. The present invention uses compressed sensing to evaluate a sparse version of the signal in various dimensions, so it fully computes the entire spatio-temporal volume which viewed as frames in a video sequence.

The present invention can be applied to structured illumination which can be used for problems in graphics such as light transport acquisition and environment matting as well as computer vision such as 3-D reconstruction and 3-D stereo if Bernoulli patterns are used.

As discussed above, point sample measurements are used, which is particularly feasible in simulated environments (such as rendering systems) or certain imaging systems. Yet, with respect to another aspect of the invention, other kinds of linear measurements can be performed such as projecting light patterns and then integrating the reflected light in a sensor. This allows integral projections to be performed quite easily. Therefore, the present invention provides a process of illuminating Bernoulli random light patterns. The idea of projecting Bernoulli random light patterns with a projector in order to reconstruct the signal using compressed sensing is quite useful.

In one embodiment, compressed sensing accelerates the acquisition of the light transport between a projector and a camera thereby enabling performance of dual photography more efficiently. Dual photography allows the interchangeability between a projector and a camera in a scene after the light transport between them has been measured. Thus, an image from the point-of-view of the projector as illuminated by the camera can be computed.

To perform dual photography using compressed sensing, the measurement matrix is chosen as a Bernoulli matrix since it is always incoherent with a sparse inducing basis such as wavelet. Bernoulli patterns for illumination make it easy to implement the present invention because the same simple, binary patterns can be illuminated whether or not the signal is wavelet compressed. Thus, wavelet basis functions never have to be illuminated.

Using a single camera-projector pair, the target resolution of the dual photograph is set and then a bounding region in projector space that covers the desired scent is set in order to compute the illumination patterns. The size of the pixels of the Bernoulli pattern is then computed to the nearest pixel in projector space. After the image is capture, the reflectance function of each pixel is independently computed.

Figure 5:
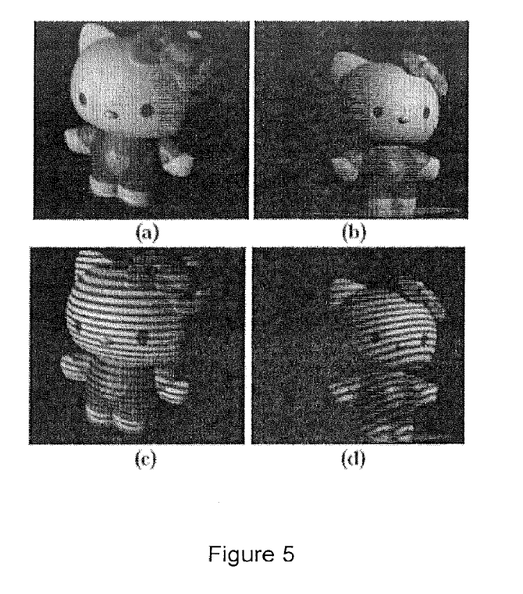
FIG. 5 illustrates dual photography using compressed sensing according to the present invention.

As shown in FIG. 5, the original image shown in (a) is transformed into dual images taken from the point-of-view of the projector (b). Since the light transport between the camera and the projector has been captured, these images can be relit in both the primal domain as shown in (c) and the dual domain shown in (d).

Figure 6:
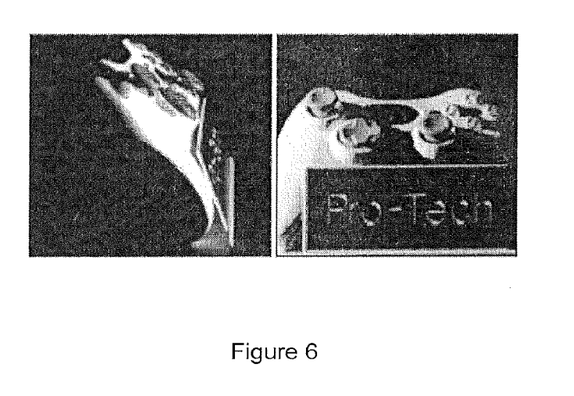
FIG. 6 illustrates another embodiment of dual photography using compressed sensing according to the present invention.

FIG. 6 illustrates details not easily visible in the original image. The original image is shown on the left of FIG. 6 whereas the dual image is shown on the right.

FIG. 6 illustrates how certain detail can be drastically enhanced in the dual image. By exchanging the projector and camera, an image can be computed form the point-of-view of the projector in order to see the text more clearly than could be seen from the camera.

Figure 7:
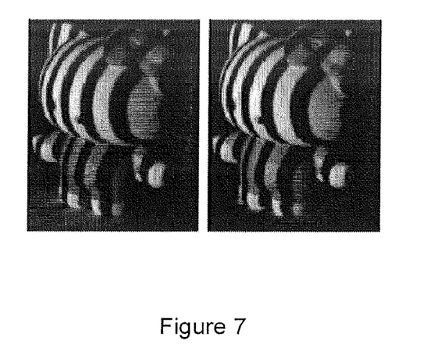
FIG. 7 illustrates reconstructed light transport of dual photography according to the present invention.
Figure 8:
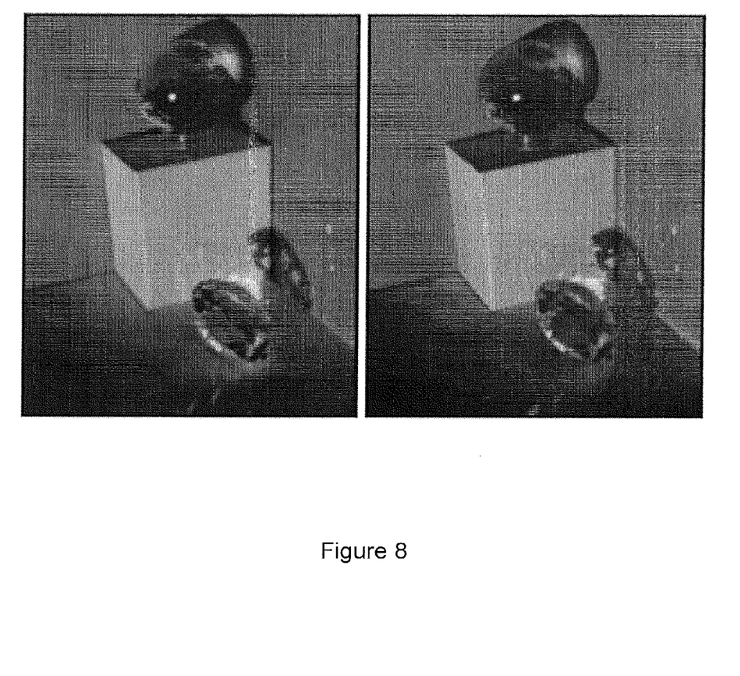
FIG. 8 illustrates global illumination effects of dual photography according to the present invention.

FIG. 7 illustrates the comparison between an original image relit as a post-process to an original image obtained by projecting the same pattern on the projector during acquisition. The original image obtained by projecting a pattern onto the scene is shown on the left. The image computed using compressed sensing according to the present invention is shown on the right. Furthermore, global illumination effects such as caustics and diffuse-diffuse interreflection is shown in FIG. 8. The original image is on the left of FIG. 8 and the image rendered from the light transport acquired through the present invention is shown on the right.

By integrating all the pixels of the camera together a single-pixel camera can be simulated that uses the projector for imaging trough dual photography. According to the present invention, the projector both modulates the Bernoulli pattern and performs the imaging. Compressed sensing is used to efficiently acquire the reflectance function at a fraction of the time it would take a brute-force scan.

Compressed sensing can be mapped to a more general set of problems in computer graphics and computer imaging. Representation of a rendered scene in the formulation $y=A\hat{x}$ produces higher-quality rendering with less samples than previous approaches. A filter formulation 1 makes point samples compatible with wavelet and therefore allows reconstruction of 2-D images from a set of measured pixels (point samples).

The described embodiments are to be considered in all respects only as illustrative and not restrictive, and the scope of the invention is not limited to the foregoing description. Those of skill in the art will recognize changes, substitutions and other modifications that will nonetheless come within the scope of the invention and range of the claims.

What is claimed is:

1. A computer system method for reconstructing a signal using compressed sensing, the method comprising the steps of:
providing by a processor an original signal;
selecting by the processor a plurality of random point samples of a multidimensional function;
assuming by the processor the original signal is sparse in a transform domain;
measuring by the processor the original signal at one or more locations of the plurality of random point samples to obtain one or more first measurements;
solving by the processor for a signal in the transform domain that is as sparse as possible and matches the one or more first measurements;
estimating by the processor one or more second measurements of a plurality of missing point samples from the signal in the transform domain of said solving step; and
computing by the processor an image.

2. The method of claim 1 wherein said solving step further comprises the step of using wavelets for compression.

3. The method of claim 2 wherein said using step further comprises the step of applying a filter.

4. The method of claim 3 wherein the filter is a Gaussian filter.

5. The method of claim 1 applied to rendering, wherein the image is of a given scene representation.

6. The method of claim 1 wherein the original signal is a three-dimensional signal.

7. The method of claim 6 wherein the three-dimensional signal relates to a scene moving over time, which produces an image with motion blur.

8. The method of claim 1 wherein the original signal is two-dimensional signal.

9. The method of claim 8 wherein the two-dimensional signal relates to rendering an image.

10. The method of claim 9 wherein the two-dimensional signal further relates to image antialiasing.

11. The method of claim 1 wherein the original signal is a multidimensional signal.

12. The method of claim 11 wherein the multidimensional signal relates to rendering multidimensional effects including at least one selected from the group of depth-of-field, area light sources, diffuse reflection, sub-surface scattering.

13. The method of claim 11 wherein the multidimensional signal is a four-dimensional signal.

14. The method of claim 13 wherein the four-dimensional signal relates to light transport between a two-dimensional light source and a two-dimensional imaging sensor.

15. The method of claim 14 wherein the two-dimensional light source is a projector.

16. The method of claim 14 wherein the two-dimensional light source is a monitor.

17. The method of claim 14 wherein the light transport relates to dual photography.

18. The method of claim 1, further comprising the step of adding by the processor a Bernoulli pattern for illumination.

19. The method of claim 1, wherein said assuming step further comprises the step of assuming the original signal is sparse in the spatial domain such that no transform is necessary.

* * * * *